(12) United States Patent
Krantz et al.

(10) Patent No.: US 9,774,571 B2
(45) Date of Patent: Sep. 26, 2017

(54) AUTOMATIC PROVISIONING OF MEETING ROOM DEVICE

(71) Applicant: Microsoft Technology Licensing, LLC, Redmond, WA (US)

(72) Inventors: Anton W. Krantz, Kirkland, WA (US); Chaim Fried, Brooklyn, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/643,941

(22) Filed: Mar. 10, 2015

(65) Prior Publication Data

US 2016/0269366 A1   Sep. 15, 2016

(51) Int. Cl.
| | |
|---|---|
| *H04L 29/06* | (2006.01) |
| *G06Q 10/10* | (2012.01) |
| *H04L 12/18* | (2006.01) |
| *H04L 9/08* | (2006.01) |
| *H04L 9/30* | (2006.01) |
| *H04L 12/24* | (2006.01) |
| *H04L 29/08* | (2006.01) |

(52) U.S. Cl.
CPC ......... *H04L 63/0428* (2013.01); *G06Q 10/10* (2013.01); *H04L 9/08* (2013.01); *H04L 9/30* (2013.01); *H04L 12/1818* (2013.01); *H04L 41/0806* (2013.01); *H04L 65/1069* (2013.01); *H04L 65/403* (2013.01); *H04L 67/16* (2013.01)

(58) Field of Classification Search
CPC  H04L 63/0492; H04L 9/0844; H04L 41/0806
USPC ......................................................... 713/150
See application file for complete search history.

(56) References Cited

U.S. PATENT DOCUMENTS

| | | | |
|---|---|---|---|
| 7,428,638 | B1 | 9/2008 | Chen et al. |
| 7,809,124 | B2 | 10/2010 | Archambault et al. |
| 7,920,706 | B2 | 4/2011 | Asokan et al. |
| 7,929,703 | B2 | 4/2011 | Bellows et al. |
| 8,045,489 | B2 | 10/2011 | Lee et al. |
| 8,082,509 | B2 | 12/2011 | Orsolini et al. |
| 8,131,828 | B2 | 3/2012 | Lin et al. |
| 8,200,819 | B2 | 6/2012 | Chung et al. |
| 8,214,880 | B1 * | 7/2012 | Wu .............. H04L 63/0876 379/15.03 |
| 8,254,578 | B2 | 8/2012 | Paksoy et al. |
| 8,295,191 | B2 | 10/2012 | Leung et al. |

(Continued)

FOREIGN PATENT DOCUMENTS

| | | |
|---|---|---|
| EP | 1715690 | 10/2006 |
| EP | 2608449 A1 | 6/2013 |

(Continued)

OTHER PUBLICATIONS

Mark Stefik; Beyond the Chdlkboard:Computer Support for Coiia0oration and Problem Soivihig /IV Meetings;ACM, Jan. 1987 vol. 30 No. 1; p. 32-47.*

(Continued)

*Primary Examiner* — Monjour Rahim (57) ABSTRACT

Various embodiments enable meeting room devices to be produced such that, after purchase, the devices can be automatically provisioned by a meeting service. Automatic provisioning takes place over a communication network through a trust relationship that is established between the meeting room device and the meeting service.

25 Claims, 5 Drawing Sheets

(56) References Cited

U.S. PATENT DOCUMENTS

| | | | |
|---|---|---|---|
| 8,522,019 | B2 | 8/2013 | Michaelis |
| 8,576,750 | B1 | 11/2013 | Hecht et al. |
| 8,718,626 | B2 | 5/2014 | Rose et al. |
| 8,812,837 | B2 | 8/2014 | McCanna et al. |
| 9,240,984 | B2 * | 1/2016 | Thielen ............... G06F 9/4411 |
| 2002/0018569 | A1 * | 2/2002 | Panjwani ............. H04L 63/061 |
| | | | 380/247 |
| 2002/0023217 | A1 | 2/2002 | Wheeler et al. |
| 2006/0075234 | A1 * | 4/2006 | You ....................... H04L 9/321 |
| | | | 713/169 |
| 2009/0132682 | A1 * | 5/2009 | Counterman ........... H04L 63/08 |
| | | | 709/220 |
| 2009/0179983 | A1 | 7/2009 | Schindler |
| 2009/0210490 | A1 | 8/2009 | Hawkins et al. |
| 2009/0325491 | A1 | 12/2009 | Bell et al. |
| 2011/0197266 | A1 | 8/2011 | Chu et al. |
| 2011/0225417 | A1 * | 9/2011 | Maharajh ................ G06F 21/10 |
| | | | 713/150 |
| 2011/0258434 | A1 * | 10/2011 | Qiu ......................... H04L 9/006 |
| | | | 713/153 |
| 2011/0271332 | A1 | 11/2011 | Jones et al. |
| 2012/0185291 | A1 * | 7/2012 | Ramaswamy ..... G06Q 10/1095 |
| | | | 705/7.19 |
| 2012/0213370 | A1 * | 8/2012 | Moskovics ............. G06F 21/57 |
| | | | 380/278 |
| 2013/0145284 | A1 | 6/2013 | Anantharaman et al. |
| 2013/0179509 | A1 | 7/2013 | McGloin et al. |
| 2013/0219479 | A1 | 8/2013 | DeSoto et al. |
| 2014/0047524 | A1 * | 2/2014 | Auger ..................... G06K 5/00 |
| | | | 726/7 |
| 2014/0093074 | A1 * | 4/2014 | Gotze .................. H04L 9/0866 |
| | | | 380/45 |
| 2014/0095867 | A1 * | 4/2014 | Smith .................. H04L 9/0822 |
| | | | 713/164 |
| 2014/0104372 | A1 | 4/2014 | Calman et al. |
| 2014/0137205 | A1 | 5/2014 | Brown et al. |
| 2014/0149570 | A1 | 5/2014 | Berger et al. |
| 2014/0179276 | A1 | 6/2014 | Kang et al. |
| 2014/0181521 | A1 * | 6/2014 | Hemphill ............. H04L 9/0819 |
| | | | 713/171 |
| 2014/0297820 | A1 * | 10/2014 | Grubis ................ H04L 41/0806 |
| | | | 709/222 |
| 2014/0313282 | A1 | 10/2014 | Ma et al. |
| 2015/0012990 | A1 * | 1/2015 | Copsey ............... H04L 63/0815 |
| | | | 726/7 |
| 2015/0081837 | A1 * | 3/2015 | Bernier .................. H04W 8/24 |
| | | | 709/217 |
| 2015/0113592 | A1 * | 4/2015 | Curtis ................ H04L 63/0823 |
| | | | 726/2 |
| 2015/0304851 | A1 * | 10/2015 | Chen ..................... H04W 12/08 |
| | | | 713/172 |
| 2016/0269409 | A1 | 9/2016 | Fried et al. |

FOREIGN PATENT DOCUMENTS

| | | |
|---|---|---|
| JP | 2004240932 | 8/2004 |
| WO | WO-2006085269 | 8/2006 |

OTHER PUBLICATIONS

"International Search Report and Written Opinion", Application No. PCT/US2016/021897, Apr. 22, 2016, 11 pages.

"The Wimba Classroom Tool in Blackboard", Saint Joseph's University Technology Service Center Facebook—Retrieved from the internet: www.facebook.com/SJUTSC/posts/25310168149273—on Apr. 13, 2016, 1 pages.

"Using Wimba Live", Adams Online Blackboard Learn + Tutorials—Retrieved from the internet at: www.adams.edu/academics/ait/img/usingwimba.pdf—on Apr. 13, 2016, 13 pages.

"Lobby Functionality and Live Meeting Capabilities in Communicator "14"", Retrieved From: <http://blogs.technet.com/b/lync/archive/2010/09/03/lobby-functionality-and-live-meeting-capabilities-in-communicator-14.aspx>, Sep. 3, 2010, 3 pages.

"Cisco TelePresence Video Systems", Available at: <http://www.cisco.com/c/dam/en/us/td/docs/telepresence/endpoint/ex-series/tc5/getting_started_guide/video_systems_getting_started_guide_tc50.pdf>, Nov. 2011, 42 pages.

Schertz,"Third-Party Video Conferencing with Lync", Retrieved From: <http://blog.schertz.name/2011/10/lync-3rd-party-video-interop/> Mar. 19, 2015, Oct. 13, 2011, 13 pages.

"International Search Report and Written Opinion", Application No. PCT/US2016/021413, Jun. 14, 2016, 10 pages.

"Non-Final Office Action", U.S. Appl. No. 14/657,918, Jul. 18, 2016, 27 pages.

"Final Office Action", U.S. Appl. No. 14/657,918, Nov. 7, 2016, 42 pages.

"Second Written Opinion Issued in PCT Application No. PCT/US2016/021413", Mailed Date: Feb. 14, 2017, 5 Pages.

"Second Written Opinion Issued in PCT Application No. PCT/US2016/021897", Mailed Date: Feb. 7, 2017, 5 Pages.

"Non-Final Office Action", U.S. Appl. No. 14/657,918, Jul. 17, 2017, 43 pages.

"International Preliminary Report on Patentability", Application No. PCT/US2016/021897, May 18, 2017, 6 pages.

"International Preliminary Report on Patentability", Application No. PCT/US2016/021413, Jun. 6, 2017, 6 pages.

* cited by examiner

AUTOMATIC PROVISIONING OF MEETING ROOM DEVICE

BACKGROUND

Online meetings have become increasingly more popular in the last several years. Online meetings enable people at different locations to meet and collaborate in a high-quality meeting experience. Yet, existing meeting room devices such as video conferencing systems are expensive and typically require expert attention from, for example, an information technology (IT) professional in order to set up and provision the system. In the recent past, one industry trend has been toward lower cost meeting room devices that can be purchased by end-users. A major challenge for users of these devices lies in adequately provisioning a particular device in the absence of an IT professional while ensuring that such provisioning is secure and performed for an authorized device/user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments enable meeting room devices to be produced such that, after purchase, the devices can be automatically provisioned by a meeting service. Automatic provisioning takes place over a communication network through a trust relationship that is established between the meeting room device and the meeting service.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Various embodiments enable meeting room devices to be produced such that, after purchase, the devices can be automatically provisioned by a meeting service. Automatic provisioning takes place over a communication network through a trust relationship that is established between the meeting room device and the meeting service. The various embodiments thus provide an out-of-the-box solution that helps end users easily and seamlessly acquire a meeting room device and have it automatically provisioned by a meeting service without requiring much more than simply plugging it in.

In the following discussion, an example environment is first described that is operable to employ the techniques described herein. The techniques may be employed in the example environment, as well as in other environments.

Example Environment

Figure 1:
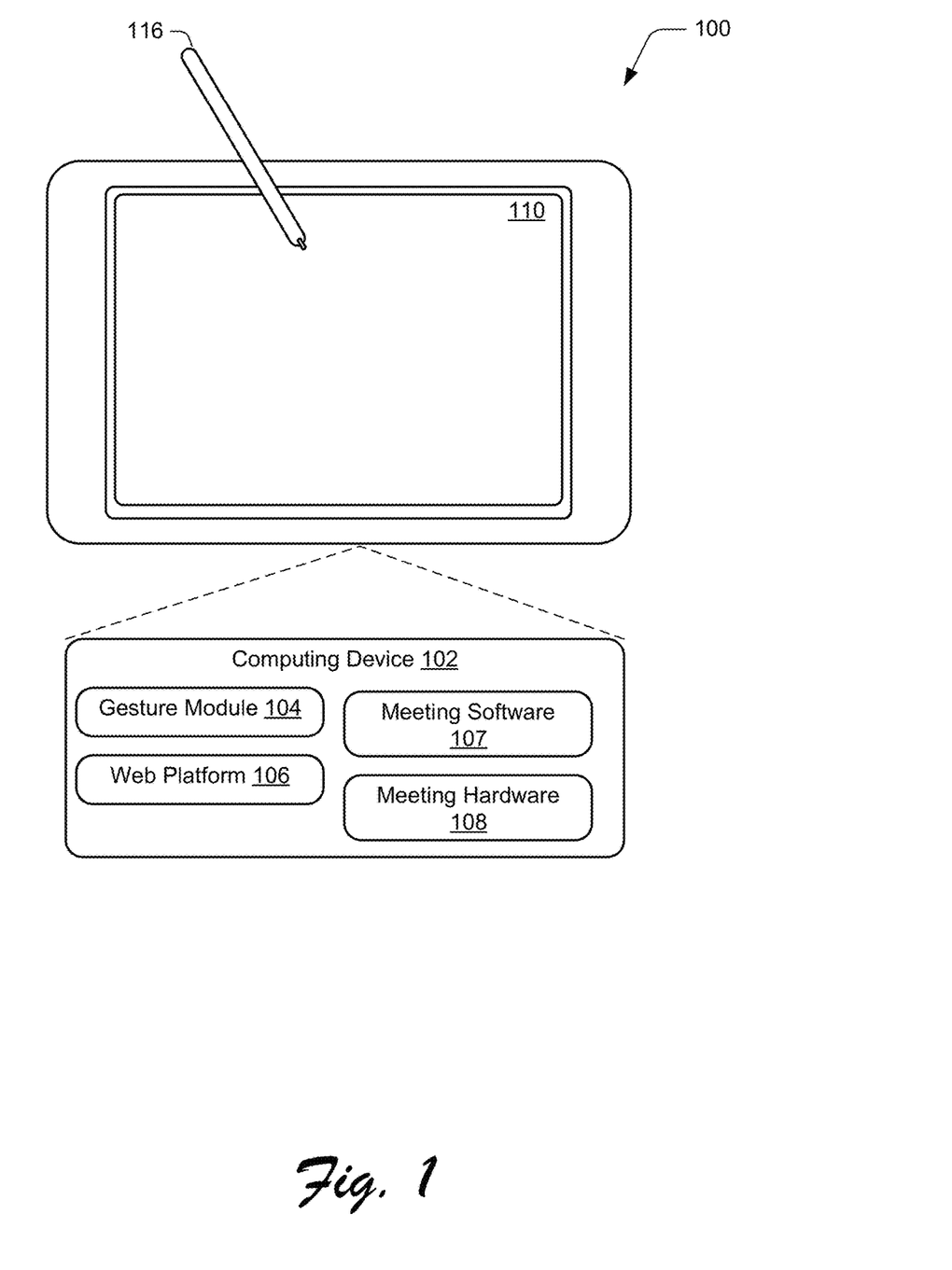
FIG. 1 is an illustration of an example meeting room device in accordance with one or more embodiments.

FIG. 1 is an illustration of an environment 100 in an example implementation that is operable to employ the techniques as described herein. The illustrated environment 100 includes an example of a meeting room device 102 that may be configured in a variety of ways. In this example, meeting room device 102 represents a computing device that is utilized to plan and conduct a meeting. The meeting room device 102 typically resides in a meeting room or conference room in which many different types of meetings can take place.

Figure 2:
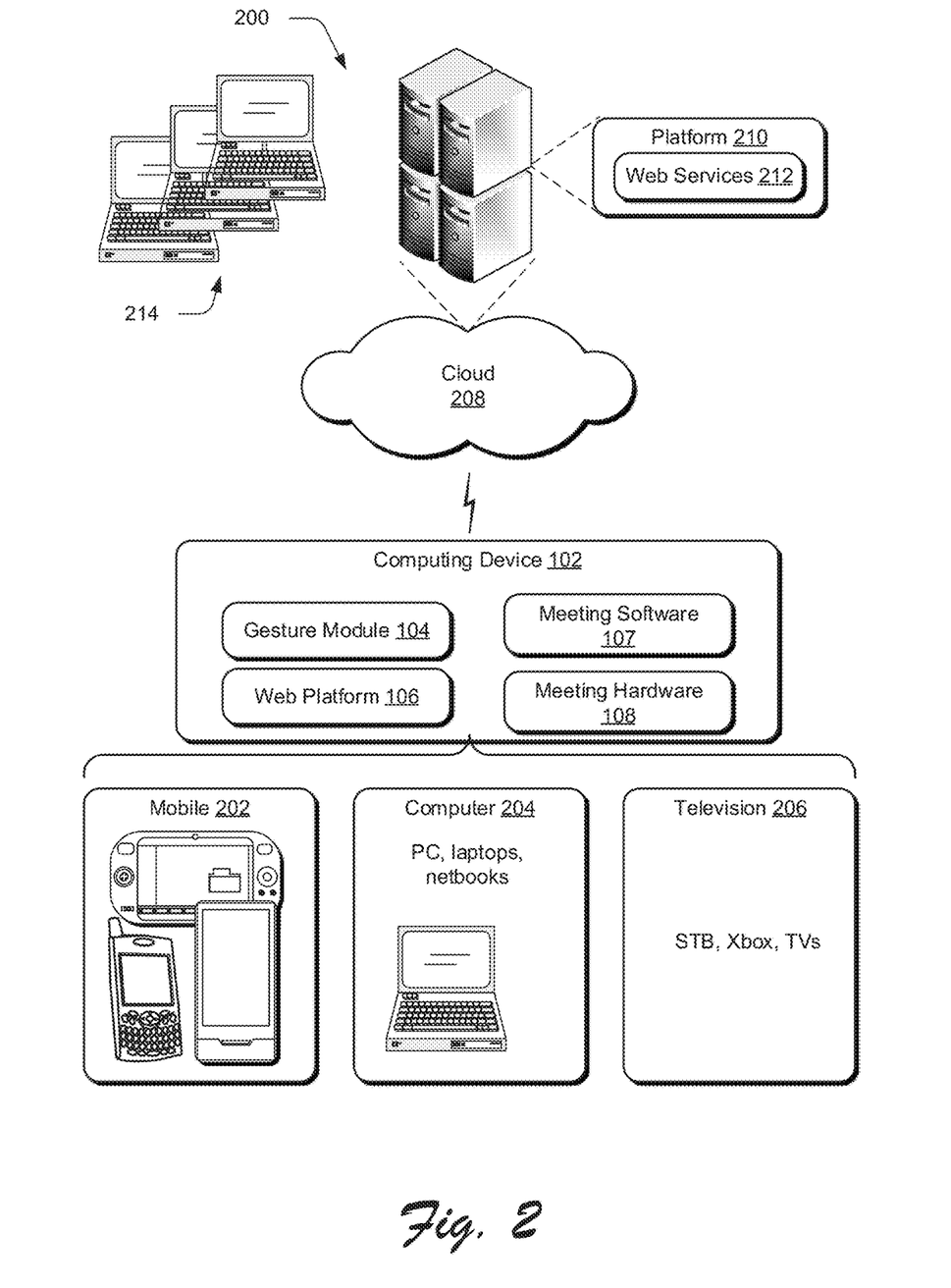
FIG. 2 is an illustration of an example environment in accordance with one or more embodiments.

The meeting room device 102 may be configured as a traditional computer (e.g., a desktop personal computer, laptop computer, and so on), a mobile station, a wireless phone, a netbook, a handheld device, and so forth as further described in relation to FIG. 2. Thus, the meeting room device 102 may range from full resource devices with substantial memory and processor resources (e.g., personal computers) to a low-resource device with limited memory and/or processing resources. The meeting room device 102 also includes software that causes the meeting room device 102 to perform one or more operations as described below. In at least some embodiments, the meeting room device 102 is a large form factor device that provides a canvas for idea collaboration.

Meeting room device 102 can include, by way of example and not limitation, a number of different components including a gesture module 104, a web platform 106, meeting software 107, and meeting hardware 108.

The gesture module 104 is operational to provide gesture functionality. The gesture module 104 can be implemented in connection with any suitable type of hardware, software, firmware or combination thereof. In at least some embodiments, the gesture module 104 is implemented in software that resides on some type of computer-readable storage medium examples of which are provided below.

Gesture module 104 is representative of functionality that recognizes gestures that can be performed by one or more fingers, and causes operations to be performed that correspond to the gestures. The gestures may be recognized by module 104 in a variety of different ways. For example, the gesture module 104 may be configured to recognize a touch input, such as a finger of a user's hand as proximal to display device 110 of the meeting room device 102 using touchscreen functionality.

It is to be appreciated and understood that a variety of different types of gestures may be recognized by the gesture module 104 including, by way of example and not limitation, gestures that are recognized from a single type of input (e.g., touch gestures such as a drag-and-drop gesture) as well as gestures involving multiple types of inputs. For example, module 104 can be utilized to recognize single-finger gestures and bezel gestures, multiple-finger/same-hand gestures and bezel gestures, and/or multiple-finger/different-hand gestures and bezel gestures.

For example, the meeting room device 102 may be configured to detect and differentiate between a touch input (e.g., provided by one or more fingers of the user's hand) and a stylus or pen input (e.g., provided by a stylus 116). The differentiation may be performed in a variety of ways, such as by detecting an amount of the display device 110 that is contacted by the finger of the user's hand versus an amount of the display device 110 that is contacted by the stylus 116.

Thus, the gesture module 104 may support a variety of different gesture techniques through recognition and leverage of a division between stylus and touch inputs, as well as different types of touch inputs.

The web platform 106 is a platform that works in connection with content of the web, e.g. public content. A web platform 106 can include and make use of many different types of technologies such as, by way of example and not limitation, URLs, HTTP, REST, HTML, CSS, JavaScript, DOM, and the like. The web platform 106 can also work with a variety of data formats such as XML, JSON, and the like. Web platform 106 can include various web browsers, web applications (i.e. "web apps"), and the like. When executed, the web platform 106 allows the computing device to retrieve web content such as electronic documents in the form of webpages (or other forms of electronic documents, such as a document file, XML file, PDF file, XLS file, etc.) from a Web server and display them on the display device 110. It should be noted that meeting room device 102 could be any computing device that is capable of displaying Web pages/documents and connect to the Internet.

Meeting software 107 is representative of software that enables meetings to be conducted using various features which can include, by way of example and not limitation, instant messaging, Voice over IP, video conferencing, and the like. The meeting software can also include such things as a cloud-based whiteboard tool that enables meeting participants to write upon the display device 110. The meeting software can also include provisioning software that enables the meeting room device to be automatically provisioned as described below in more detail.

Meeting hardware 108 is representative of hardware that enables meetings to be conducted as described above and below. The hardware can include, by way of example and not limitation, built-in sensors to help the meeting room device wakeup when a person is in close proximity and track a person's movement so that one or more cameras (e.g., 1080p cameras on each side of the meeting room device) can follow the person. In addition, the meeting hardware 108 can work in concert with the meeting software 107 to provide meeting starts using a single touch. The hardware and software of the meeting room device can also allow participants to share content wirelessly, thus making meetings engaging and productive. The meeting hardware 108 can also include a built-in microphone array. Further, the meeting hardware 108 can include information and data that can be utilized by the meeting software to execute an automatic provisioning process. The information and data can be stored on the meeting room device in protected storage.

FIG. 2 illustrates an example system 200 showing the components of FIG. 1, e.g., meeting software 107 and meeting hardware 108, as being implemented in an environment where multiple devices are interconnected through a central computing device. The meeting software 107 and meeting hardware 108 can enable the meeting room device, i.e. computing device 102, to be automatically provisioned as described below. Once automatically provisioned, meetings can be conducted using various features which can include, by way of example and not limitation, instant messaging, Voice over IP, video conferencing, whiteboard functionality, content sharing and the like.

The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described the meeting room device 102 may be configured in a variety of different ways, such as for mobile 202, computer 204, and television 206 uses. Each of these configurations has a generally corresponding screen size and thus the meeting room device 102 may be configured as one of these device classes in this example system 200. For instance, the meeting room device 102 may assume the mobile 202 class of device which includes mobile telephones, music players, game devices, and so on. The meeting room device 102 may also assume a computer 204 class of device that includes personal computers, laptop computers, netbooks, tablets, large form factor devices, and so on. The television 206 configuration includes configurations of device that involve display in a casual environment, e.g., televisions, set-top boxes, game consoles, and so on. Thus, the techniques described herein may be supported by these various configurations of the meeting room device 102 and are not limited to the specific examples described in the following sections.

As described above, meeting room device 102 includes meeting software 107 that operates as described above and below.

Cloud 208 is illustrated as including a platform 210 for web services 212. The platform 210 abstracts underlying functionality of hardware (e.g., servers) and software resources of the cloud 208 and thus may act as a "cloud operating system." For example, the platform 210 may abstract resources to connect the meeting room device 102 with other computing devices. The platform 210 may also serve to abstract scaling of resources to provide a corresponding level of scale to encountered demand for the web services 212 that are implemented via the platform 210. Web services 212 can include a meeting service that is configured to automatically provision a meeting room device as described above and below.

Thus, the cloud 208 is included as a part of the strategy that pertains to software and hardware resources that are made available to the meeting room device 102 via the Internet or other networks. For example, aspects of the meeting software 107 may be implemented in part on the meeting room device 102 as well as in a distributed fashion via platform 210 that supports web services 212.

In addition, system 200 can include one or more remote computing devices 214 associated with remote participants who can participate in a meeting organized and conducted through meeting room device 102. Each of the remote computing devices 214 can execute a meeting client that enables communication with meeting software 107.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

For example, the computing device may also include an entity (e.g., software) that causes hardware or virtual machines of the computing device to perform operations, e.g., processors, functional blocks, and so on. For example, the computing device may include a computer-readable medium that may be configured to maintain instructions that cause the computing device, and more particularly the operating system and associated hardware of the computing device to perform operations. Thus, the instructions function to configure the operating system and associated hardware to perform the operations and in this way result in transformation of the operating system and associated hardware to perform functions. The instructions may be provided by the computer-readable medium to the computing device through a variety of different configurations.

One such configuration of a computer-readable medium is a signal bearing medium and thus is configured to transmit the instructions (e.g., as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

In the discussion that follows, a section entitled "Automatically Provisioning a Meeting Room Device" describes how a meeting room device can be automatically provisioned in accordance with one or more embodiments. Last, a section entitled "Example Meeting Room Device" describes aspects of an example device that can be utilized to implement one or more embodiments.

Having considered an example operating environment, consider now a discussion of how a meeting room device can be automatically provisioned in accordance with one or more embodiments.

Automatically Provisioning a Meeting Room Device

One of the challenges with meeting room devices, such as the one described in this document, is that these devices are produced by the thousands and can typically be sold through retail channels to any consumer. As such, and because the ultimate destination of each meeting room device is not known when it is built at the factory, the devices cannot typically be pre-provisioned, e.g., provided with information and data for the people who wish to use it. Such information can include, by way of example and not limitation, specific account information, connectivity information, various policies that are to be applied to the device, and the like.

Various embodiments enable meeting room devices to be produced such that, after purchase, the devices can be automatically provisioned by a meeting service. Automatic provisioning takes place over a communication network through a trust relationship that is established between the meeting room device and the meeting service.

Figure 3:
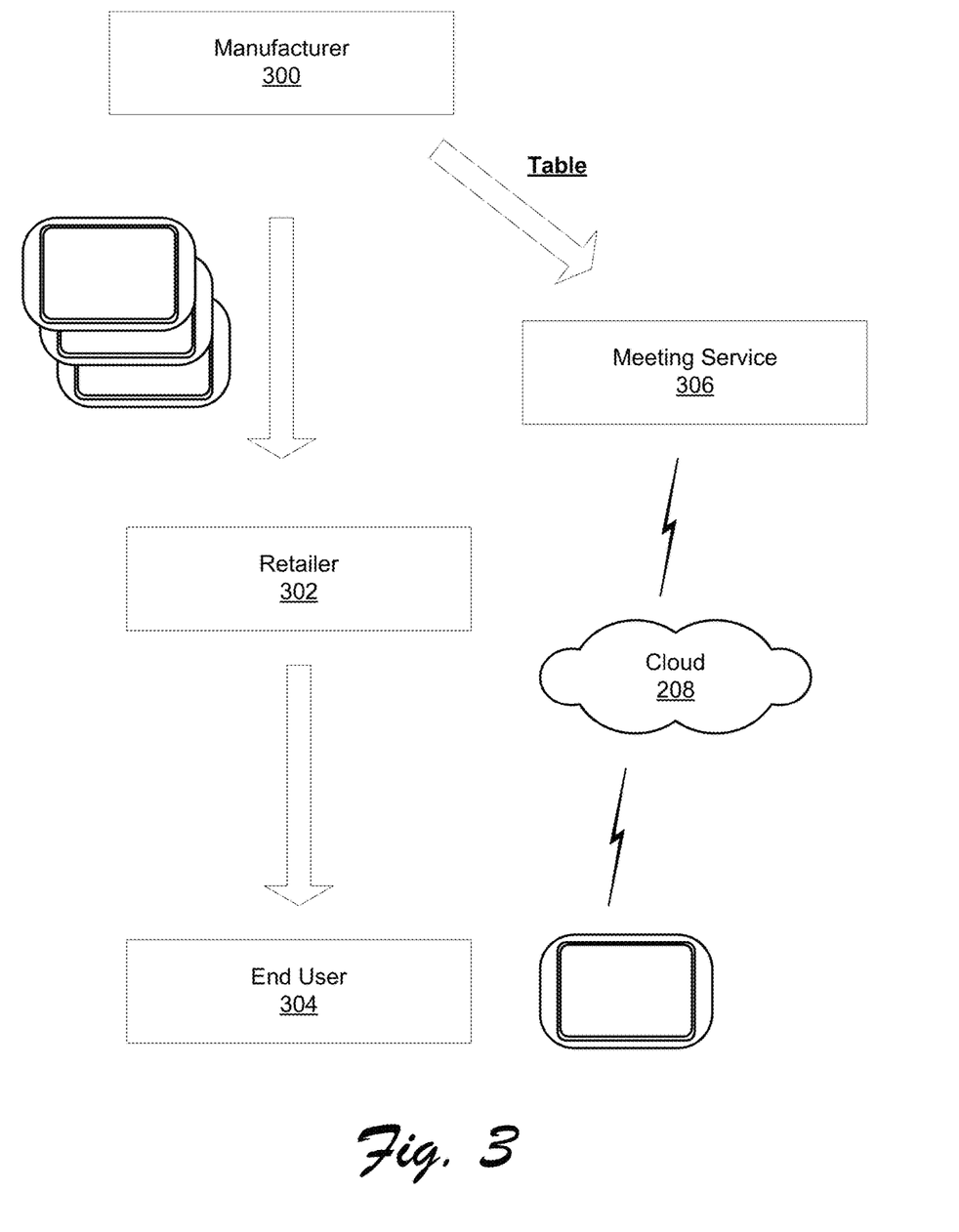
FIG. 3 is an example system in accordance with one or more embodiments.

As an example of how an automatic provisioning process can be implemented, consider FIG. 3 and the various entities appearing therein. Specifically, FIG. 3 illustrates four different entities including a manufacturer 300, a retailer 302, an end user 304, and a meeting service 306.

One goal of the automatic provisioning process is to be able to establish a trust relationship between a particular meeting room device and the meeting service 306. In one or more embodiments, the foundation of this trust relationship can begin at the manufacturer 300. That is, when the meeting room devices are manufactured, the manufacturer 300 provides, for each meeting room device, information that can be later utilized to establish a trust relationship with the meeting service 300. Any suitable type of information can be utilized. Typically this information enables the meeting service 306 to establish that the meeting room device is, in fact, an authorized and legitimate meeting room device. In the illustrated and described embodiment, this information includes a unique identifier for each particular meeting room device. In addition to the unique identifier, the manufacturer can provide a key, such as a unique key, on each device. Any suitable type of key can be utilized including, by way of example and not limitation, a private key of a public/private key pair. The private key is burned into hardware of each meeting room device and remains in a protected space. The corresponding public key is maintained by the meeting service 306. Each unique identifier can be added to a table which is provided from the manufacturer 300 to the meeting service 306 so that the meeting service can look for the meeting room devices when the meeting room devices attempt to register with the meeting service 306.

The manufacturer 300 then provides the meeting room devices to the retailer 302 for sale. Subsequently, an end user 304 purchases a particular meeting room device and wishes to activate it to conduct meetings.

In the illustrated and described embodiment, the meeting room device is configured to automatically discover the meeting service 306 once the meeting room device has been connected to a suitable network, such as cloud 208. Automatic discovery of the meeting service can be enabled in any suitable way such as, by way of example and not limitation, a URL that points to the meeting room service and instructions to contact the meeting service. Discovery can also take place by way of DNS SRV record, auto discovery record, preconfigured URL, and the like. Once connected to the meeting service 306, a setup process is initiated. To begin with, the meeting room device encrypts its unique identifier using its key, e.g., a private key. The encrypted unique identifier is then transmitted to the meeting service 306 which, in turn, decrypts the unique identifier using the corresponding public key. The meeting service 306 cross-checks the unique identifier against unique identifiers appearing in the table that was previously provided to it by the manufacturer 300. If the unique identifier has a match, then a trust relationship is established and provisioning can automatically take place. That is, based on the matching unique identifiers, the meeting room device can be activated and automatically provisioned, as by having various policies transmitted to the meeting room device that control how the meeting room device works. For example, various default policies can be assigned to the meeting room device based on the device type, such as by way of example and not limitation, bandwidth allocation, video resolution, and user authentication type allowed.

Once the meeting room device is provisioned or as an additional part of the provisioning process, an account generation process can be invoked to establish an account for the meeting room device that it can use to automatically and directly connect to the meeting service 306. Any suitable technique can be utilized to enable the meeting room device to automatically connect to the meeting service 306.

For example, the meeting service 306, through a communication service, can automatically generate a communications identity that the meeting room device uses to directly communicate with the meeting service. One example of a communications identity is a SIP URI or an HTTP URL. A SIP URI is the SIP (Session Initiation Protocol) addressing scheme that communicates who to call via SIP. In other words, a SIP URI is a user's phone number or identifier such as "meetingdevice1234@service.com". Alternately or additionally, a direct connection to the meeting service 306 can be made using an identifier associated with a particular user, such as the user's own pre-existing SIP URI or meeting ID.

Now that the meeting room device has been automatically provisioned, they can participate in and enable meetings to be conducted.

Figure 4:
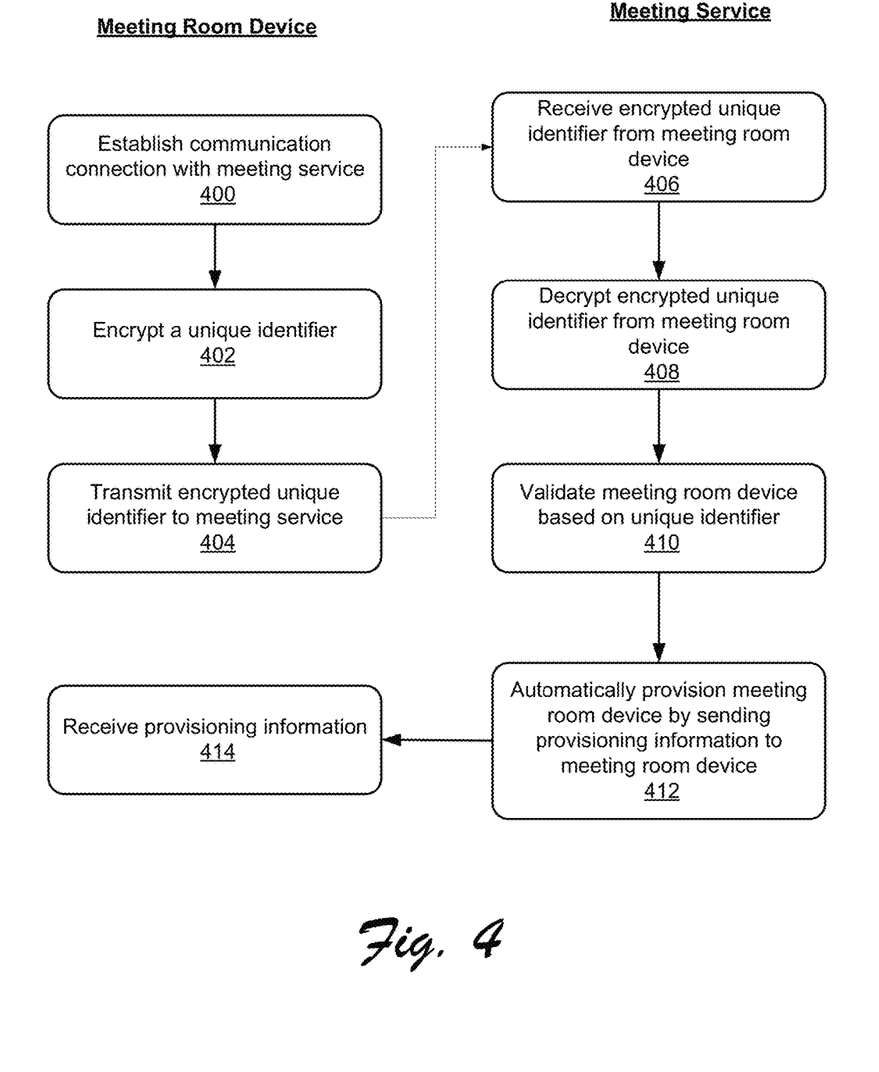
FIG. 4 is a flow diagram that describes steps in a method in accordance with one or more embodiments.

FIG. 4 is a flow diagram that describes steps in a method in accordance with one or more embodiments. The method can be implemented in connection with any suitable hardware, software, firmware, or combination thereof. In at least some embodiments, aspects of the method can be implemented by a suitably-configured meeting room device executing meeting software. These aspects appear under the heading "Meeting Room Device." Yet other aspects of the method can be implemented by a suitably-configured meeting service. These aspects appear under the heading "Meeting Service."

Step 400 establishes a communication connection with a meeting service. This step can be automatically performed by the meeting room device when the meeting room device is connected to a suitably-configured network. That is, the meeting room device can have information thereon which describes a particular meeting service to contact, and how to contact that meeting service. Step 402 encrypts a unique identifier. Any suitable unique identifier can be utilized in any suitable method of encryption can be utilized. For example, encryption (and decryption) can take place using a symmetric key. Alternately, encryption can take place, as described above, using a private key of a public/private key pair. Step 404 transmits the encrypted unique identifier to the meeting service.

Step 406 receives the encrypted unique identifier from a meeting room device. Step 408 decrypts the encrypted unique identifier that was received from the meeting room device. This step can be performed in any suitable way. For example, if a symmetric key was used to encrypt the unique identifier, the same symmetric key can be utilized to decrypt unique identifier. Alternately, if the unique identifier was encrypted using a private key of a public/private key pair, the corresponding public key can be utilized to decrypt the unique identifier. Step 410 validates the meeting room device based on the unique identifier. This step can be performed in any suitable way. For example, in at least some embodiments, validation can take place by comparing the unique identifier with a table of unique identifiers that was previously received from a manufacturer. Responsive to validating the unique identifier, step 412 automatically provisions the meeting room device by sending provisioning information to the meeting room device. Any suitable type of provisioning information can be utilized. Provisioning information can include, by way of example and not limitation, various default policies, operational parameters, connectivity information to enable the meeting room device to directly connect to the meeting service, and the like.

Step 414 receives the provisioning information from the meeting service and uses the provisioning information to automatically provision the meeting room device.

Having considered automatic provisioning of a meeting room device in accordance with one or more embodiments, consider now a discussion of an example meeting room device in accordance with one or more embodiments.

Example Meeting Room Device

Figure 5:
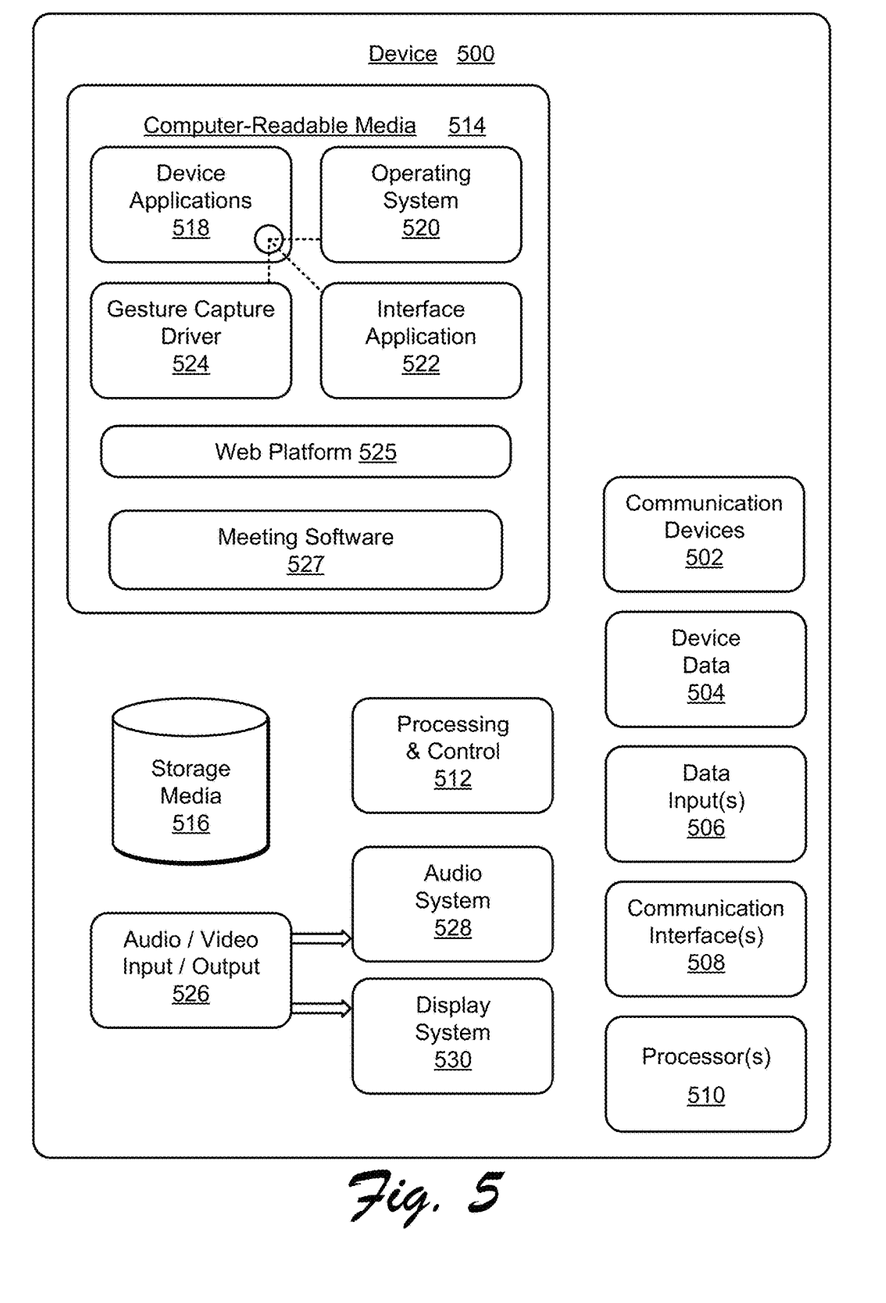
FIG. 5 illustrates an example meeting room device that can be utilized to implement various embodiments described herein.

FIG. 5 illustrates various components of an example meeting room device 500 that can be implemented as any type of computing device as described with reference to FIGS. 1 and 2 to implement embodiments of the techniques described herein. Aspects of device 500 can be utilized to implement a computing device that executes a meeting service as described herein.

Device 500 includes communication devices 502 that enable wired and/or wireless communication of device data 504 (e.g., received data, data that is being received, data scheduled for broadcast, data packets of the data, etc.). The device data 504 or other device content can include configuration settings of the device, media content stored on the device, and/or information associated with a user of the device. Media content stored on device 500 can include any type of audio, video, and/or image data. Device 500 includes one or more data inputs 506 via which any type of data, media content, and/or inputs can be received, such as user-selectable inputs, messages, music, television media content, recorded video content, and any other type of audio, video, and/or image data received from any content and/or data source.

Device 500 also includes communication interfaces 508 that can be implemented as any one or more of a serial and/or parallel interface, a wireless interface, any type of network interface, a modem, and as any other type of communication interface. The communication interfaces 508 provide a connection and/or communication links between device 500 and a communication network by which other electronic, computing, and communication devices communicate data with device 500, such as in the context of the meeting.

Device 500 includes one or more processors 510 (e.g., any of microprocessors, controllers, and the like) which process various computer-executable instructions to control the operation of device 500 and to implement embodiments of the techniques described herein. Alternatively or in addition, device 500 can be implemented with any one or combination of hardware, firmware, or fixed logic circuitry that is implemented in connection with processing and control circuits which are generally identified at 512. Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 500 also includes computer-readable media 514, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 500 can also include a mass storage media device 516.

Computer-readable media 514 provides data storage mechanisms to store the device data 504, as well as various device applications 518 and any other types of information and/or data related to operational aspects of device 500. For example, an operating system 520 can be maintained as a computer application with the computer-readable media 514 and executed on processors 510. The device applications 518 can include a device manager (e.g., a control application, software application, signal processing and control module, code that is native to a particular device, a hardware abstraction layer for a particular device, etc.). The device applications 518 also include any system components or modules to implement embodiments of the techniques described herein. In this example, the device applications 518 include an interface application 522 and a gesture capture driver 524 that are shown as software modules and/or computer applications. The gesture capture driver 524 is representative of software that is used to provide an interface with a device configured to capture a gesture, such as a touchscreen, track pad, camera, and so on. Alternatively or in addition, the interface application 522 and the gesture capture driver 524 can be implemented as hardware, software, firmware, or any combination thereof. Additionally, computer readable media 514 can include a web platform 525 and meeting software 1027 that functions as described above.

Device 500 also includes an audio and/or video input-output system 526 that provides audio data to an audio system 528 and/or provides video data to a display system 530. The audio system 528 and/or the display system 530 can include any devices that process, display, and/or otherwise render audio, video, and image data. Video signals and audio signals can be communicated from device 500 to an audio device and/or to a display device via an RF (radio frequency) link, S-video link, composite video link, component video link, DVI (digital video interface), analog audio connection, or other similar communication link. In an embodiment, the audio system 528 and/or the display system 530 are implemented as external components to device 500. Alternatively, the audio system 528 and/or the display system 530 are implemented as integrated components of example device 500.

Example Implementations

Example implementations described herein include, but are not limited to, one or any combination of one or more of the following example:

A computer-implemented method comprising: establishing, by a meeting room device, a communication connection with a meeting service; encrypting, by the meeting room device, information that can be used to establish a trust relationship with the meeting service; transmitting, by the meeting room device, the encrypted information to the meeting service effective to enable the meeting service to identify and validate the meeting room device; and receiving, by the meeting room device, provisioning information from the meeting service and using the provisioning information to automatically provision the meeting room device.

A method as described above, wherein said encrypting is performed using a symmetric key.

A method as described above, wherein said encrypting is performed using a private key of a public/private key pair.

A method as described above, wherein the information comprises a unique identifier, the unique identifier identifying the meeting room device and having been provided on the meeting room device prior to purchase.

A method as described above, wherein the meeting room device is configured to automatically discover the meeting service.

A method as described above, wherein said provisioning information includes one or more policies that control how the meeting room device works.

A method as described above, wherein said provisioning information includes one or more of bandwidth allocation, video resolution, or user authentication type allowed.

A method as described above, wherein said provisioning information includes information to enable the meeting room device to directly connect to the meeting service.

A computer-implemented method comprising: receiving, at a meeting service, encrypted information that can be used to establish a trust relationship with a meeting room device to enable the meeting room device to be automatically provisioned by the meeting service; decrypting, at the meeting service, the encrypted information that was received from the meeting room device; validating, at the meeting service, the meeting room device based on the information that was received from the meeting room device; responsive to validating the information received from the meeting room device, automatically provisioning the meeting room device by sending provisioning information to the meeting room device.

A method as described above, wherein said decrypting is performed using a symmetric key.

A method as described above, wherein said decrypting is performed using a public key of a public/private key pair, the private key having been used to encrypt the information.

A method as described above, wherein the information comprises a unique identifier identifying the meeting room device.

A method as described above, wherein said validating is performed by comparing the information that was received from the meeting room device with information received from a manufacturer of the meeting room device.

A method as described above, wherein said provisioning information includes one or more policies that control how the meeting room device works.

A method as described above, wherein said provisioning information includes one or more of bandwidth allocation, video resolution, or user authentication type allowed.

A method as described above, wherein said provisioning information includes information to enable the meeting room device to directly connect to the meeting service.

A meeting room device comprising: one or more processors; one or more computer readable media; computer-readable instructions embodied on the one or more computer readable media and executable by the one or more processors to perform operations comprising: establishing a communication connection with a meeting service; encrypting information that can be used to establish a trust relationship with the meeting service; transmitting the encrypted information to the meeting service effective to enable the meeting service to identify and validate the meeting room device; and receiving provisioning information from the meeting service and using the provisioning information to automatically provision the meeting room device.

A meeting room device as described above, wherein said encrypting is performed using a private key of a public/private key pair.

A meeting room device as described above, wherein the information comprises a unique identifier, the unique identifier identifying the meeting room device and having been provided on the meeting room device prior to purchase.

A meeting room device as described above, wherein said provisioning information includes at least one of: one or more policies that control how the meeting room device works; one or more of bandwidth allocation, video resolution, or user authentication type allowed; or information to enable the meeting room device to directly connect to the meeting service.

A computing device comprising: one or more processors; one or more computer readable media; computer-readable instructions embodied on the one or more computer readable media and executable by the one or more processors to implement a meeting service configured to perform operations comprising: receiving encrypted information that can be used to establish a trust relationship with a meeting room device to enable the meeting room device to be automatically provisioned by the meeting service; decrypting the encrypted information that was received from the meeting room device; validating the meeting room device based on the unique identifier; and responsive to validating the information received from the meeting room device, automatically provisioning the meeting room device by sending provisioning information to the meeting room device.

A computing device as described above, wherein said decrypting is performed using a public key of a public/private key pair, the private key having been used to encrypt the information.

A computing device as described above, wherein the information comprises a unique identifier identifying the meeting room device.

A computing device as described above, wherein said validating is performed by comparing the information that was received from the meeting room device with information received from a manufacturer of the meeting room device.

A computing device as described above, wherein said provisioning information includes at least one of: one or more policies that control how the meeting room device works; one or more of bandwidth allocation, video resolution, or user authentication type allowed; or information to enable the meeting room device to directly connect to the meeting service.

Conclusion

Various embodiments enable meeting room devices to be produced such that, after purchase, the devices can be automatically provisioned by a meeting service. Automatic provisioning takes place over a communication network through a trust relationship that is established between the meeting room device and the meeting service.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method comprising:
   establishing, by a meeting room device, a communication connection with a meeting service implemented as a web service, the meeting room device usable to participate in a meeting with other devices via a communication network;
   encrypting, by the meeting room device, information that can be used to establish a trust relationship with the meeting service;
   transmitting, by the meeting room device, the encrypted information to the meeting service effective to enable the meeting service to identify and validate the meeting room device;
   receiving, by the meeting room device, provisioning information from the meeting service related to a class of devices corresponding to the meeting room device;
   using the provisioning information to automatically provision the meeting room device by at least setting an operational parameter of the meeting room device to support participation in the meeting; and
   responsive to using the provisioning information to provision the meeting room device, automatically invoking an account generation process to establish an account usable by the meeting room device to automatically and directly connect to the meeting service.

2. The method of claim 1, wherein said encrypting is performed using a symmetric key.

3. The method of claim 1, wherein said encrypting is performed using a private key of a public/private key pair.

4. The method of claim 1, wherein the information comprises a unique identifier, the unique identifier identifying the meeting room device and having been provided on the meeting room device prior to purchase.

5. The method of claim 1, wherein the meeting room device is configured to automatically discover the meeting service responsive to connection of the meeting room device to the communication network.

6. The method of claim 1, wherein said provisioning information includes one or more policies that control how the meeting room device works.

7. The method of claim 1, wherein said provisioning information includes one or more of bandwidth allocation, video resolution, or user authentication type allowed.

8. The method of claim 1, wherein said provisioning information includes information to enable the meeting room device to directly connect to the meeting service responsive to connection of the meeting room device to the communication network.

9. A computer-implemented method comprising:
   receiving, at a meeting service, encrypted information that can be used to establish a trust relationship with a meeting room device to enable the meeting room device to be automatically provisioned by the meeting service, the meeting service implemented as a web service via a web platform;
   decrypting, at the meeting service, the encrypted information that was received from the meeting room device;
   validating, at the meeting service, the meeting room device based on the information that was received from the meeting room device;
   responsive to validating the information received from the meeting room device, sending provisioning information to the meeting room device, the provisioning information related to a class of devices corresponding to the meeting room device and said sending the provisioning information effective to automatically provision the meeting room device by at least specifying an operational parameter of the meeting room device to support participation in a meeting; and
   responsive to automatically provisioning the meeting room device, automatically invoking an account generation process to establish an account usable for automatically establishing a direct connection between the meeting room device and the meeting service.

10. The computer-implemented method of claim 9, wherein said decrypting is performed using a symmetric key.

11. The computer-implemented method of claim 9, wherein said decrypting is performed using a public key of a public/private key pair, the private key having been used to encrypt the information.

12. The computer-implemented method of claim 9, wherein the information comprises a unique identifier identifying the meeting room device.

13. The computer-implemented method of claim 9, wherein said validating is performed by comparing the information that was received from the meeting room device with information received from a manufacturer of the meeting room device.

14. The computer-implemented method of claim 9, wherein said provisioning information includes one or more policies that control how the meeting room device works.

15. The computer-implemented method of claim 9, wherein said provisioning information includes one or more of bandwidth allocation, video resolution, or user authentication type allowed.

16. The computer-implemented method of claim 9, wherein said provisioning information includes information to enable the meeting room device to directly connect to the meeting service responsive to connection of the meeting room device to a network.

17. A meeting room device comprising:
one or more processors;
one or more computer readable storage media;
computer-readable instructions embodied on the one or more computer readable storage media and executable by the one or more processors to perform operations comprising:
establishing a communication connection with a meeting service implemented as a web service;
encrypting information that can be used to establish a trust relationship with the meeting service;
transmitting the encrypted information to the meeting service effective to enable the meeting service to identify and validate the meeting room device;
receiving provisioning information from the meeting service related to a class of devices corresponding to the meeting room device;
using the provisioning information to automatically provision the meeting room device by at least setting an operational parameter of the meeting room device to support participation in a meeting; and
automatically initiating an account generation process to establish an account usable by the meeting room device to automatically and directly connect to the meeting service and conduct a meeting with one or more additional devices.

18. The meeting room device of claim 17, wherein said encrypting is performed using a private key of a public/private key pair.

19. The meeting room device of claim 17, wherein the information comprises a unique identifier, the unique identifier identifying the meeting room device and having been provided on the meeting room device prior to purchase.

20. The meeting room device of claim 17, wherein said provisioning information includes at least one of:
one or more policies that control how the meeting room device works; or
one or more of bandwidth allocation, video resolution, or user authentication type allowed.

21. A computing device comprising:
one or more processors;
one or more computer readable media;
computer-readable instructions embodied on the one or more computer readable media and executable by the one or more processors to implement a web service via a web platform, the web service comprising a meeting service configured to perform operations comprising:
receiving encrypted information that can be used to establish a trust relationship with a meeting room device to enable the meeting room device to be automatically provisioned by the meeting service;
decrypting the encrypted information that was received from the meeting room device;
validating the meeting room device based on the unique identifier;
responsive to validating the information received from the meeting room device, sending provisioning information to the meeting room device, the provisioning information related to a class of devices corresponding to the meeting room device and said sending the provisioning information effective to automatically provision the meeting room device by at least specifying an operational parameter of the meeting room device to support participation in a meeting; and
responsive to provisioning the meeting room device, automatically initiating an account generation process to establish an account associated with the meeting room device, the account being usable to establish an automatic and direct connection between the meeting service and the meeting room device.

22. The computing device of claim 21, wherein said decrypting is performed using a public key of a public/private key pair, the private key having been used to encrypt the information.

23. The computing device of claim 21, wherein the information comprises a unique identifier identifying the meeting room device.

24. The computing device of claim 21, wherein said validating is performed by comparing the information that was received from the meeting room device with information received from a manufacturer of the meeting room device.

25. The computing device of claim 21, wherein said provisioning information includes at least one of:
one or more policies that control how the meeting room device works; or
one or more of bandwidth allocation, video resolution, or user authentication type allowed.

* * * * *